(12) United States Patent
Borlick et al.

(10) Patent No.: US 10,628,089 B2
(45) Date of Patent: *Apr. 21, 2020

(54) PROCESSING OF A SET OF PENDING OPERATIONS FOR A SWITCHOVER FROM A FIRST STORAGE RESOURCE TO A SECOND STORAGE RESOURCE

(71) Applicant: INTERNATIONAL BUSINESS MACHINES CORPORATION, Armonk, NY (US)

(72) Inventors: Matthew G. Borlick, Tucson, AZ (US); Clint A. Hardy, Tucson, AZ (US); Matthew J. Kalos, Tucson, AZ (US); Karl A. Nielsen, Tucson, AZ (US); Richard B. Stelmach, Tucson, AZ (US); Hui Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,174

(22) Filed: Jan. 22, 2019

(65) Prior Publication Data
US 2019/0155509 A1 May 23, 2019

Related U.S. Application Data

(63) Continuation of application No. 15/447,957, filed on Mar. 2, 2017, now Pat. No. 10,223,012.

(51) Int. Cl.
G06F 12/00 (2006.01)
G06F 3/06 (2006.01)

(52) U.S. Cl.
CPC ............ *G06F 3/067* (2013.01); *G06F 3/061* (2013.01); *G06F 3/065* (2013.01); *G06F 3/0619* (2013.01); *G06F 3/0635* (2013.01); *G06F 3/0649* (2013.01)

(58) Field of Classification Search
None
See application file for complete search history.

(56) References Cited

U.S. PATENT DOCUMENTS

| 7,496,789 | B2 | 2/2009 | Dasari et al. |
| 7,733,891 | B2 | 6/2010 | Reynolds et al. |
| 7,752,623 | B1 | 7/2010 | Crawford, Jr. |
| 8,443,165 | B2 | 5/2013 | Haines et al. |

(Continued)

FOREIGN PATENT DOCUMENTS

WO  2016151584 A2  9/2016

OTHER PUBLICATIONS

Z. Zhang, et al., "On the Feasibility of Dynamic Rescheduling on the Intel Distributed Computing Platform", 11th International Middleware Conference Industrial track Nov. 2010 Bangalore, India, ACM, 2010, pp. 7.

(Continued)

*Primary Examiner* — John A Lane
(74) *Attorney, Agent, or Firm* — Rabindranath Dutta; Konrad Raynes Davda & Victor LLP

(57) ABSTRACT

A determination is made that data stored in an extent of a first storage resource is to be moved to an extent of a second storage resource. Operations that are still awaiting to start execution in the first storage resource after the data stored in the extent of the first storage resource has been moved to the extent of the second storage resource, are configured for execution in the second storage resource.

18 Claims, 11 Drawing Sheets

(56) References Cited

U.S. PATENT DOCUMENTS

| | | |
|---|---|---|
| 9,032,132 B2 | 5/2015 | Jensen |
| 9,158,673 B2 | 10/2015 | Benhase et al. |
| 2012/0059994 A1 | 3/2012 | Montgomery et al. |
| 2015/0227586 A1 | 8/2015 | Li et al. |

OTHER PUBLICATIONS

U.S. Appl. No. 15/447,957 filed Mar. 2, 2017, (18.715).
Office Action dated Jun. 22, 2018, pp. 11, for U.S. Appl. No. 15/276,484.
Response dated Sep. 24, 2018, pp. 11, to Office Action dated Jun. 22, 2018, pp. 11, for U.S. Appl. No. 15/276,484.
Notice of Allowance dated Oct. 19, 2018, pp. 5, for U.S. Appl. No. 15/276,484.
List of IBM Patents or Patent Applications Treated as Related, dated Jan. 22, 2019, pp. 2.

PROCESSING OF A SET OF PENDING OPERATIONS FOR A SWITCHOVER FROM A FIRST STORAGE RESOURCE TO A SECOND STORAGE RESOURCE

CROSS-REFERENCE TO RELATED APPLICATION

This application is a continuation of U.S. patent application Ser. No. 15/447, 957, filed Mar. 2, 2017, which application is incorporated herein by reference in its entirety.

BACKGROUND

1. Field

Embodiments relate to a method, system, and computer program product for processing a set of pending operations for a switchover from a first storage resource to a second storage resource.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

Tiered storage is the assignment of different categories of data to different types of storage devices to reduce total storage cost. Tiers may be determined by performance and cost of the storage devices, and data may be ranked based on how often the data is accessed. Certain tiered storage policies may place the most frequently accessed data on the highest performing storage device, and rarely accessed data may be placed on low-performance, cheaper storage devices.

In certain situations, data may be moved from one storage tier which is performing operations relatively slowly, to another storage tier that is able to perform operations relatively faster.

SUMMARY OF THE PREFERRED EMBODIMENTS

Provided are a method, a system, and a computer program product in which a determination is made that data stored in an extent of a first storage resource is to be moved to an extent of a second storage resource. Operations that are still awaiting to start execution in the first storage resource after the data stored in the extent of the first storage resource has been moved to the extent of the second storage resource, are configured for execution in the second storage resource.

In certain embodiments, the operations comprise input/output (I/O) requests. A plurality of pending I/O requests on the extent of the first storage resource are stored, while the data stored in the extent of the first storage resource is being copied to the extent of the second storage resource, wherein the plurality of pending I/O requests have not been transmitted to the first storage resource for execution at least at some instant of time prior to completion of copying of data stored in the extent of the first storage resource to the extent of the second storage resource. In response to completion of copying of data stored in the extent of the first storage resource to the extent of the second storage resource, an indication is made that those I/O requests of the plurality of pending I/O requests that have not been transmitted to the first storage resource for execution, are to be executed in the second storage resource and not in the first storage resource.

In further embodiments, a higher priority is indicated for those I/O requests of the plurality of pending I/O requests that have not been transmitted to the first storage resource for execution, in comparison to other I/O requests, in response to indicating that those I/O requests of the plurality of pending I/O requests that have not been transmitted to the first storage resource for execution, are to be executed in the second storage resource and not in the first storage resource.

In yet further embodiments, a higher priority is indicated for the plurality of pending I/O requests in comparison to other I/O requests prior to completion of copying of data stored in the extent of the first storage resource to the extent of the second storage resource, wherein at least some of the plurality of pending I/O requests are transmitted to the first storage resource for execution prior to completion of copying of data stored in the extent of the first storage resource to the extent of the second storage resource, and remaining I/O requests comprising those I/O requests of the plurality of pending I/O requests that have not been transmitted to the first storage resource for execution, are scheduled for execution in the second storage resource and not in the first storage resource.

In certain embodiments, a determination is made as to whether a first estimated time to execute a set of pending operations on a first storage resource and subsequently perform a switchover to a second storage resource exceeds a second estimated time to pause the set of pending operations, perform the switchover to the second storage resource and subsequently execute the set of pending operations on the second storage resource. In response to determining that the first estimated time exceeds the second estimated time, performing the switchover to the second storage resource.

In additional embodiments, in response to determining that the first estimated time does not exceed the second estimated time, the set of pending operations are executed on the first storage resource and subsequently the switchover to the second storage resource is performed.

In yet additional embodiments, a monitoring of performance of the first storage resource and the second storage resource is performed. In response to determining that the first storage resource has a slower response time for processing operations than the second storage resource, a process is initiated to move data to the second storage resource.

In further embodiments, in response to completion of moving data from the first storage resource to the second storage resource, and indicating that those I/O requests of the plurality of pending I/O requests that have not been transmitted to the first storage resource for execution, are to be executed in the second storage resource and not in the first storage resource, performing operations comprising updating a pointer that pointed to the first storage resource to point to the second storage resource.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In a tiered storage management system, the performance of different storage resources may be monitored. If one storage resource is busier than others, the storage management system may move some data from the busy storage resource to one that is less busy. This is done because when a storage resource is extremely busy, the response times can become too high. Moving the data spreads the operations across more storage resources and this reduces the response times. Such mechanisms may perform the copying of data from the busy resource to the less busy resource.

In certain embodiments, if an extent (i.e., a data structure for storing data) is moved from an overloaded first storage resource to a relatively lightly loaded second storage resource, then pending operations (i.e., operations on a pending queue of the first storage resource that have not been sent to the first storage resource for execution) on a first storage resource are executed on the second storage resource after the movement of the extent to the second storage resource.

Exemplary Embodiments

Figure 1:
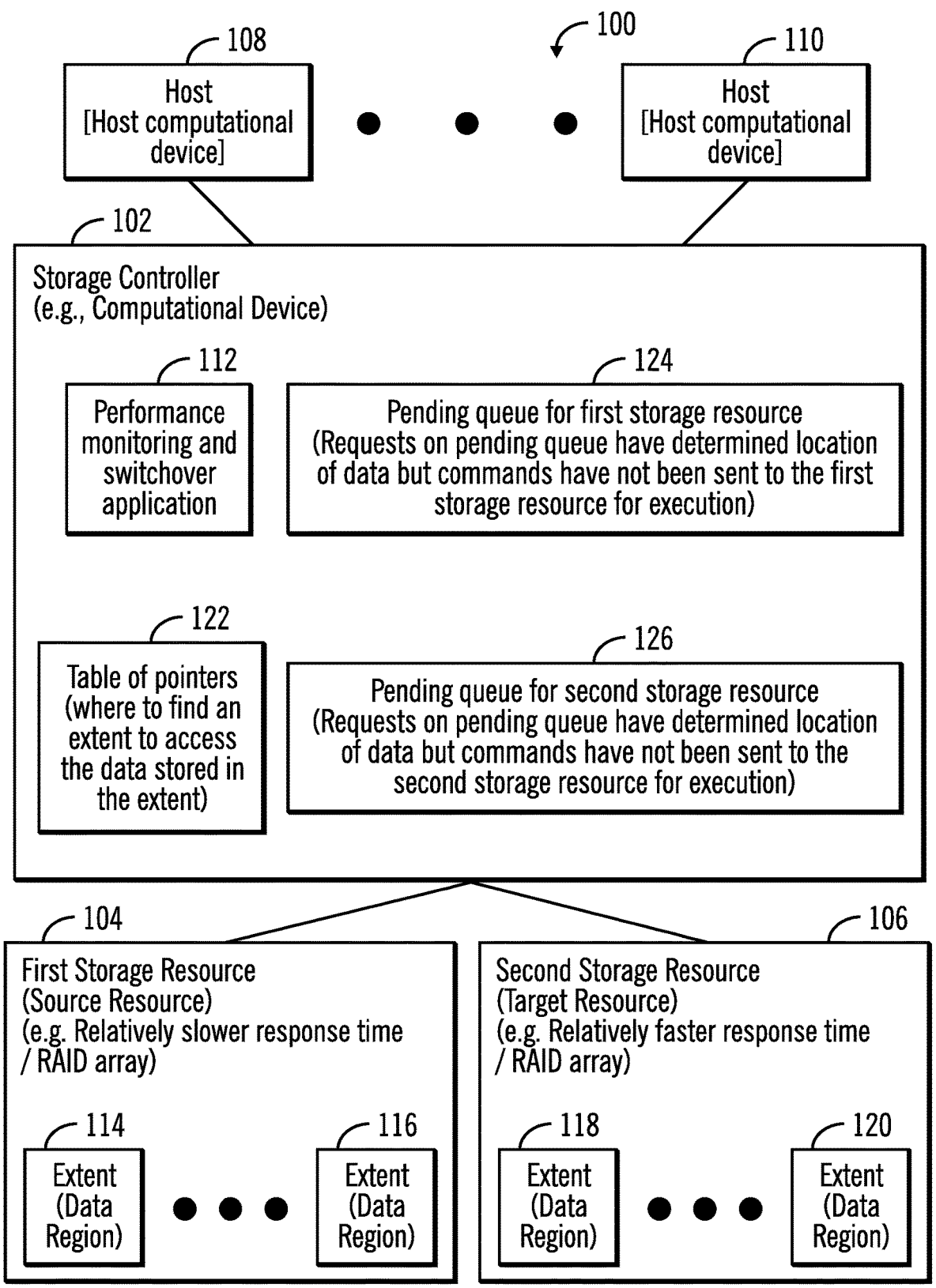
FIG. 1 illustrates a block diagram of a computing environment comprising a storage controller that is configured to communicate with a plurality of storage devices, in accordance with certain embodiments.

FIG. 1 illustrates a block diagram of a computing environment 100 comprising a storage controller 102 that is configured to communicate with a first storage resource 104 and a second storage resource 106, in accordance with certain embodiments. The storage controller 102 allows a plurality of host computational devices 108, 110 to perform input/output (I/O) operations with logical storage maintained by the storage controller 102. The physical storage corresponding to the logical storage is found in the storage resources 104, 106, where the storage resources 104, 106 are also referred to as resources.

The storage controller 102 may be comprised of a plurality of server computational devices, where the server computational devices may also be referred to as servers or central electronic complexes (CEC) or processor complexes. The storage controller 102 may comprise a set of hardware that includes central processing units (CPU), memory, channels, controllers, etc. The servers of the storage controller 102, and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 108, 110, and there storage resources 104, 106 may be elements in any suitable network, such as, a storage area network, a wide area network, the Internet, an intranet Each storage resource 104, 106 may be comprised of a plurality of storage devices, such as storage disks, tape drives, solid state storage, etc., that are maintained by the storage controller 102. In certain embodiments, each of the storage resources 104, 106 may be configured as a redundant array of independent disks (RAID) array, where the first storage resource 104 may have a relatively slower response time than the second storage resource 106, based on the RAID configuration and the type of storage devices that are configured in a RAID array. Additionally the performance of a storage resource such as a RAID array may depend on how busy the storage resource is, as a results of applications and software that access the storage resource.

A performance monitoring and switchover application 112 may execute in the storage controller 102, where the performance monitoring and switchover application 112 may measure the performance of each of the storage resources 104, 106, and may switch extents (i.e., copy or move data from one extent to another) from one storage resource to another. The performance monitoring and switchover application 112 may be implemented in software, firmware, or hardware, or any combination thereof, in accordance with certain embodiments.

The storage resources 104, 106 may have plurality of data areas that are referred to as extents. The size of the extents do not matter, but in certain embodiment extents of size 16 MB and 1 GB may be used. In FIG. 1 the first storage resource 104 that has a relatively slower response time stores a plurality of extents 114, 116, and the second storage resource 106 that has a relatively faster response time stores a plurality of extents 118, 120.

A logical identifier is associated with each extent. A table of pointers 122 maintains information on the location at which to find the extent. A pointer in the table of pointers 122 points to the array (resource) and the location on that resource for the physical extent that corresponds to the logical identifier. As I/O commands (reads and writes) are received, the table of pointers 122 provides indication on which resource and which extent to access to secure the data for the I/O commands. The I/O commands are also referred to as I/O requests or requests.

Figure 2:
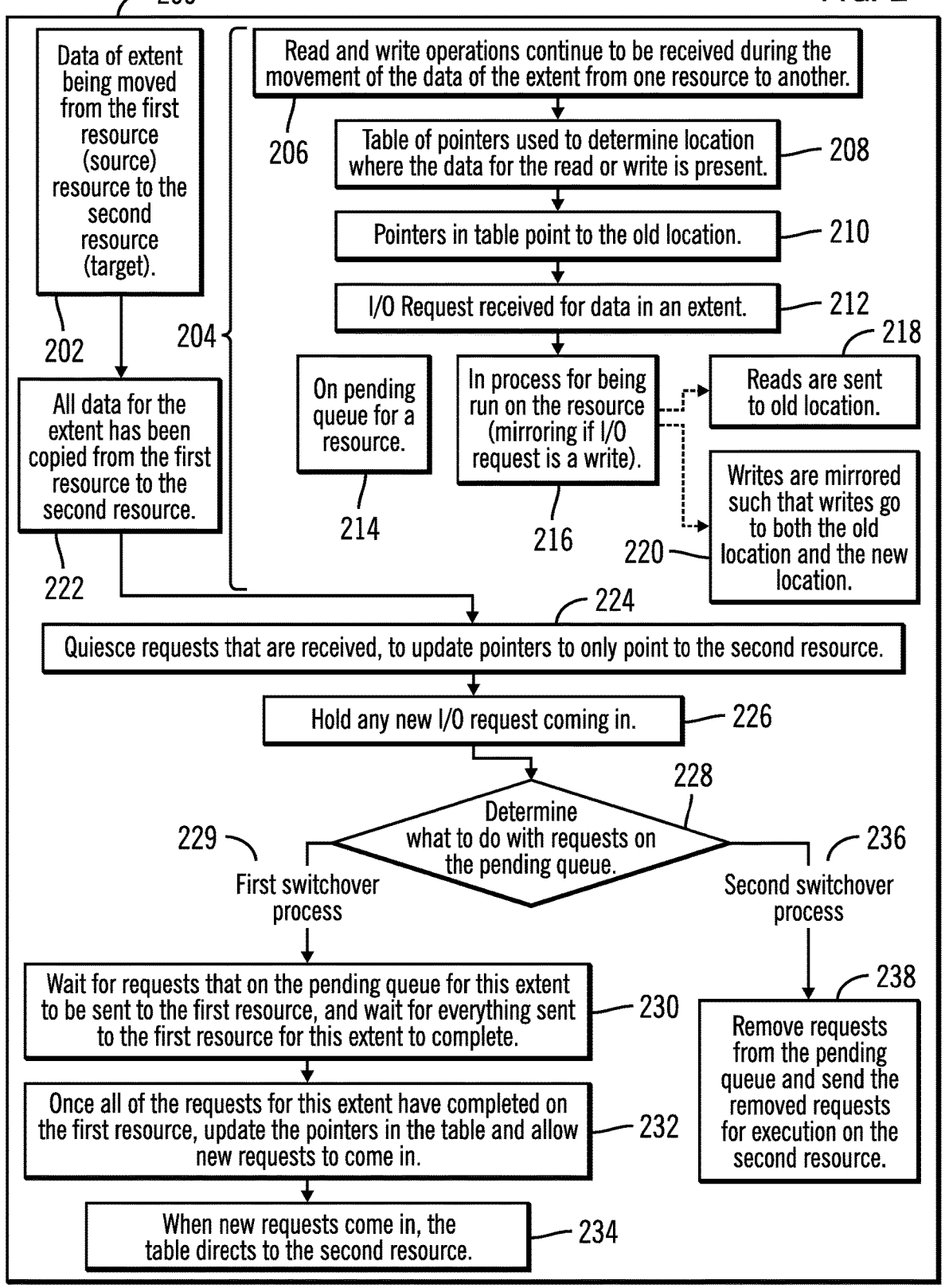
FIG. 2 illustrates a flowchart that shows operations to perform input/output (I/O) requests in a pending queue, in response to a quiescing of I/O requests after moving an extent from a first storage resource to a second storage resource, in accordance with certain embodiments.

While moving an extent between the first storage resource 104 and the second storage resource 106, the first storage resource 104 may be referred to as a source resource and the second storage resource may be referred to as a target resource. During the move, read and write I/O operation may continue to be received. As reads and writes are received, the performance monitoring and switchover application 112 may refer to the table 122 to determine where the data corresponding to the I/O operation may be found. FIG. 1 shows a pending queue 124 for the first storage resource 104, and a pending queue 126 for the second storage resource. Requests on the pending queue 124 for the first storage resource 104 have a determined location for data but commands have not been sent to the first storage resource 104 for execution. Requests on pending queue 126 for the second storage resource 106 have a determined location for data but commands have not been sent to the second storage resource 106 for execution FIG. 2 illustrates a flowchart 200 that shows operations to perform on I/O requests in a pending queue, in response to a quiescing of I/O requests after moving an extent from a first storage resource 104 to a second storage resource 106, in accordance with certain embodiments.

Control starts at block 202 in which data on an extent starts being copied and is in the process of being copied from the first storage resource (source resource) 104 to the second storage resource (target resource) 106. While the extent is in the process of being copied the operations indicated with the braces 204 may also be performed in parallel. In the operations (indicated in braces 204), read and write I/O operations may continue to be received (at block 206) during the movement of data of the extent from the first storage resource 104 to the second storage resource 106. As reads and writes are received, the performance monitoring and switchover application 112 may refer to the table 122 to determine where the data corresponding to the I/O operation may be found (at block 208). The pointers in the table 122 point to the old location, i.e., the first storage resource 204 (at block 210).

In response to receiving an I/O operation (at block 212), the performance monitoring and switchover application 112 determines the location of the data from the table 122 and puta the I/O operations/request on a pending queue 124 for that resource (at block 214) or the I/O request may be in process for being executed on the resource (at block 216). Requests on the pending queue 124 have determined the location of the data, but the commands have not actually been sent to the resource. The reasons why the commands may not be sent immediately to the resource may be based on availability of command structures to send, queue depth limits for the resource, etc. The pending queue 124 is for requests to the resource, not just for the requests to an extent on the resource. Therefore, a request that has been received for a data extent may be on the pending queue, or may be in the process of being executed on the resource. The process includes mirroring if the request is a write.

For requests being executed on the resource (at block 216), reads are sent to the old location (at block 218), and all writes are mirrored such that writes are performed to both the old location and the new location (i.e., the second storage resource 106) [at block 220]. The writes may be performed in parallel or may be performed serially.

When all of the data has been copied from the first storage resource 104 to the second storage resource 106 (at block 222), the performance monitoring and switchover application 112 needs to quiesce the requests that are received so that the pointers in the table 122 are updated to point to the new location (i.e., to second storage resource 106) [at block 224]. The performance monitoring and switchover application 112 holds (at block 226) any new requests that are coming in during the quiescing.

The performance monitoring and switchover application 112 then determines (at block 228) what to do with the requests that are on the pending queue 124. The different embodiments described relate to what operations are performed during the quiescing of the requests and the updating of the pointers. The decision to move the data has already been done, and the initial copy of the data has been performed. The requests coming in have been quiesced, and the performance monitoring and switchover application 112 is determining what to do with the requests that are on the pending queue 124.

The performance monitoring and switchover application 112 has to wait for the work that has already been sent to the first storage resource 104. However, the performance monitoring and switchover application 112 has a choice with the requests that are on the pending queue 124. The performance monitoring and switchover application 112 may either allow the requests on the pending queue 124 to be sent to the first storage resource 104 and wait for the requests to complete (as shown via branch 229), or the performance monitoring and switchover application 112 may abort the requests (i.e., remove the requests from the pending queue 124) and sends the removed requests for execution on the second storage resource 106 after pointers have been updated in the table 122 to point to the second resource 106 (as shown via branch 236 and block 238).

In a first embodiment (indicated as the first switchover process 229), the performance monitoring and switchover application 112 waits (at block 230) for requests that are on the pending queue for this extent to be sent to the first storage resource 104, and wait for requests sent to the first storage resource 104 for this extent to complete. Depending on how long it takes perform the copy, some of the requests on the pending queue 124 may even have been on the pending queue 124 since before the copy started. Once all of the requests for this extent have completed on the first storage resource 104, the performance monitoring and switchover application 112 may update the pointers in the table 122 and allow new requests to come in (at block 232). When new requests come in, the table 122 directs the requests to the second storage resource 106 (at block 234).

In a second embodiment (indicated as the second switchover process 236), the performance monitoring and switchover application 112 aborts the requests on the pending queue 124 and waits for the requests that have already been sent to the first storage resource 104 to complete. The second embodiment 236 reduces the amount of time for which requests to the extent being moved are quiesced, in comparison to the first embodiment 229. This is likely to allow the new location (i.e., the second storage resource 106) to be used faster, because the extent is being moved to the second storage resource 106 as the first storage resource 104 is overloaded with operations.

Therefore, the second embodiment 236 reduces the time of the quiesce by returning and redriving (i.e., reconfiguring for another storage resource) the requests for the extent that are still on the pending queue 124.

Figure 3:
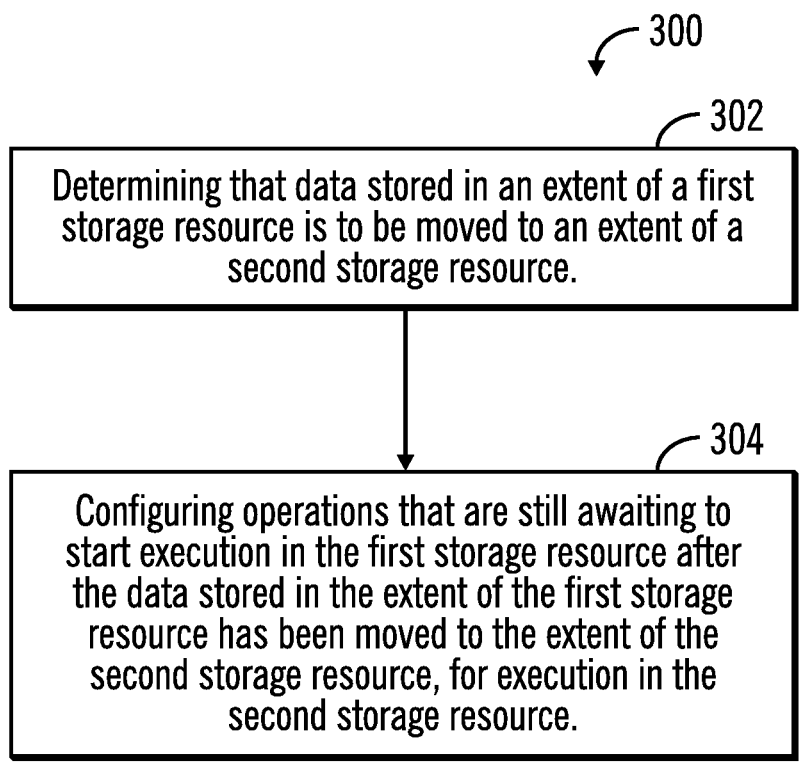
FIG. 3 illustrates a flowchart that shows operations performed by the storage controller for switchover from a first storage resource to a second storage resource, in accordance with certain embodiments.

FIG. 3 illustrates a flowchart 300 that shows operations performed by the storage controller 102 for switchover from a first storage resource 104 to a second storage resource 106, in accordance with certain embodiments.

Control starts at block 302, in which a determination is made that data stored in an extent 114 of a first storage resource 104 is to be moved to an extent 118 of a second storage resource 106. Operations that are still awaiting to start execution (i.e., operation in the pending queue 124) in the first storage resource 104 after the data stored in the extent 114 of the first storage resource 104 has been moved to the extent 118 of the second storage resource 106, are configured for execution in the second storage resource 106 (at block 304).

Figure 4:
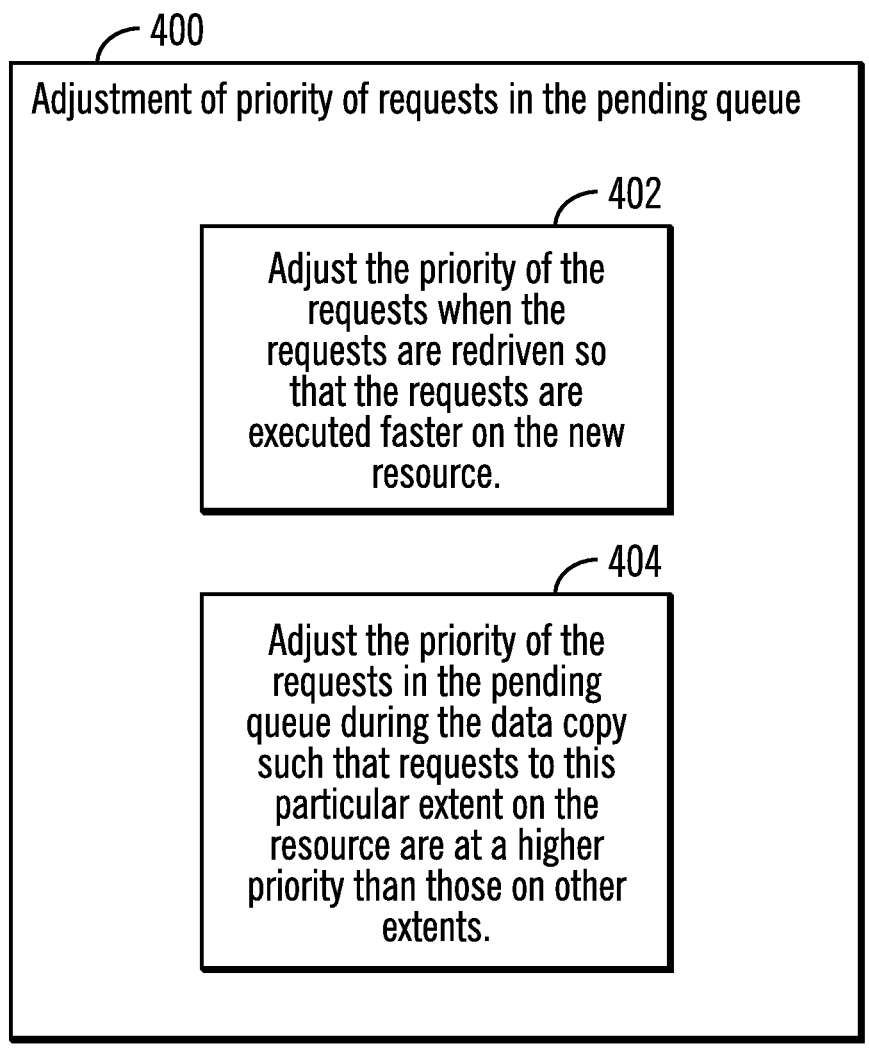
FIG. 4 illustrates a block diagram that shows the adjustment of the priority of I/O requests in a pending queue, in accordance with certain embodiments.

FIG. 4 illustrates a block diagram 400 that shows the adjustment of the priority of I/O requests in a pending queue 124, in accordance with certain embodiments.

In one embodiment (shown via reference numeral 402) the performance monitoring and switchover application 112 adjusts the priority of the requests to increase the priority of the requests when the requests are redriven so that the requests are executed faster on the new resource.

In another embodiment (shown via reference numeral 404), the performance monitoring and switchover application 112 adjusts the priorities during the data copy such that requests to a particular extent on the first storage resource 104 are a higher priority than those in other extents. This reduces the number of requests on the pending queue 124 at the time of the quiesce, thus reducing the number of requests that have to be redriven to the second resource 106. In certain embodiments, at the beginning of the migration of data from one resource to another, the priority may be the same as all other requests on the resource, but then the priority may increase the closer the migration is to completing. This may reduce the time for the quiesce, and new requests may be sent to the new resource faster.

Figure 5:
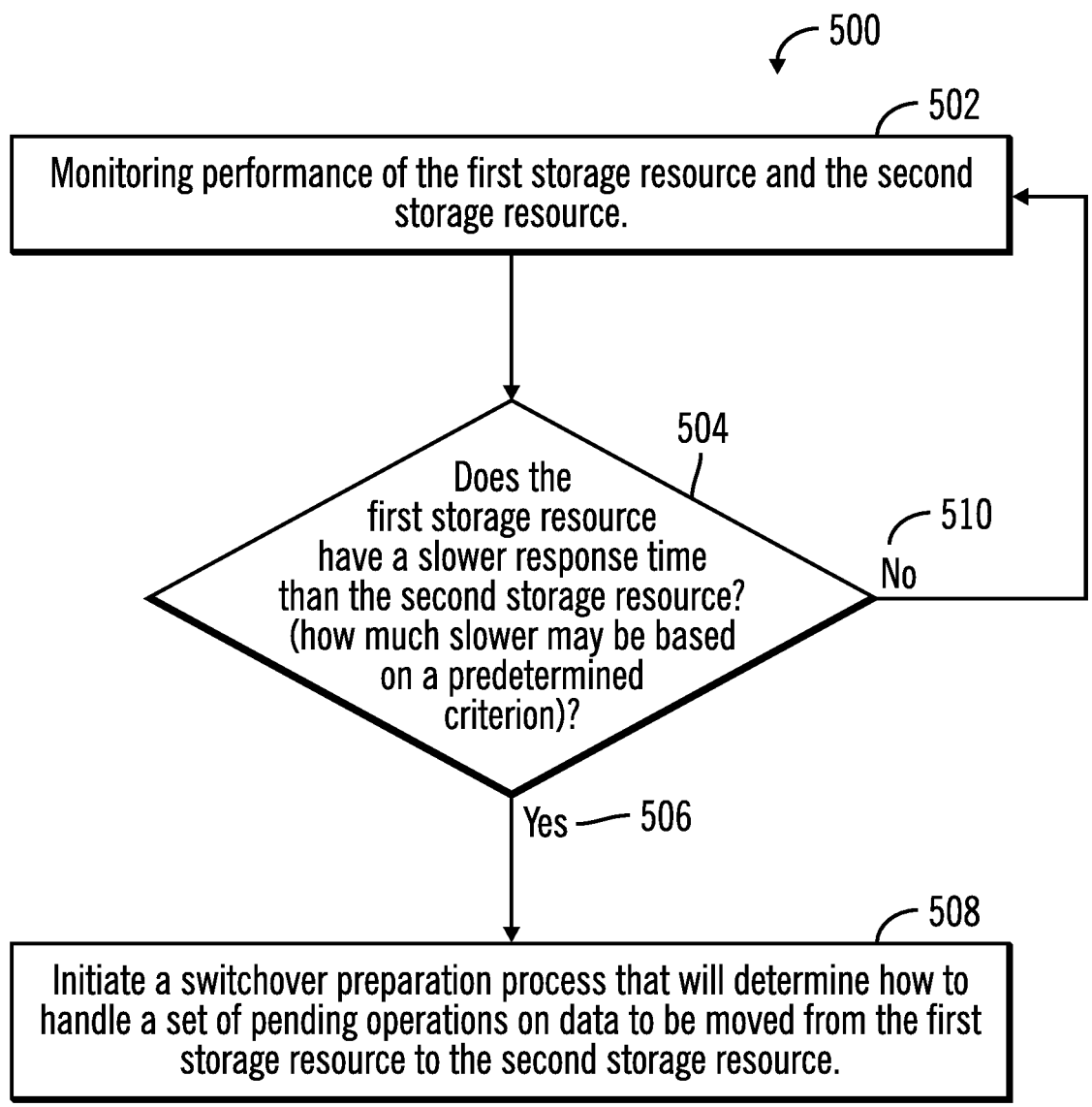
FIG. 5 illustrates a flowchart that shows when switchover operations from a first storage resource to a second storage resource are performed, in accordance with certain embodiments.

FIG. 5 illustrates a flowchart 500 that shows when switchover operations from a first storage resource 104 to a second storage resource 106 are performed, in accordance with certain embodiments.

Control starts at block 502 in which a performance monitoring and switchover application 112 monitors performance of the first storage resource 104 and the second storage resource 106. Control proceeds to block 504 in which the performance monitoring and switchover application 112 determines whether the first storage resource 104 has a slower response time than the second storage resource 106 (how much slower may be based on a predetermined criterion). If so ("Yes" branch 506), then the performance monitoring and switchover application 112 initiates (at block 508) a switchover preparation process that determines how to handle a set of pending operations on data to be moved from the first storage resource 104 to the second storage resource 106 (as shown in FIGS. 1-4). If not ("No" branch 510), control returns to block 502 from block 504.

Therefore, FIGS. 1-5 illustrate certain embodiments in which during a switchover process from a first storage resource 104 to a second storage resource 106, requests on a pending queue 124 of a first storage resource 104 are configured for execution on the second storage resource 106, instead of being executed on the first storage resource 104.

Embodiments with Timing Comparisons

Figure 7:
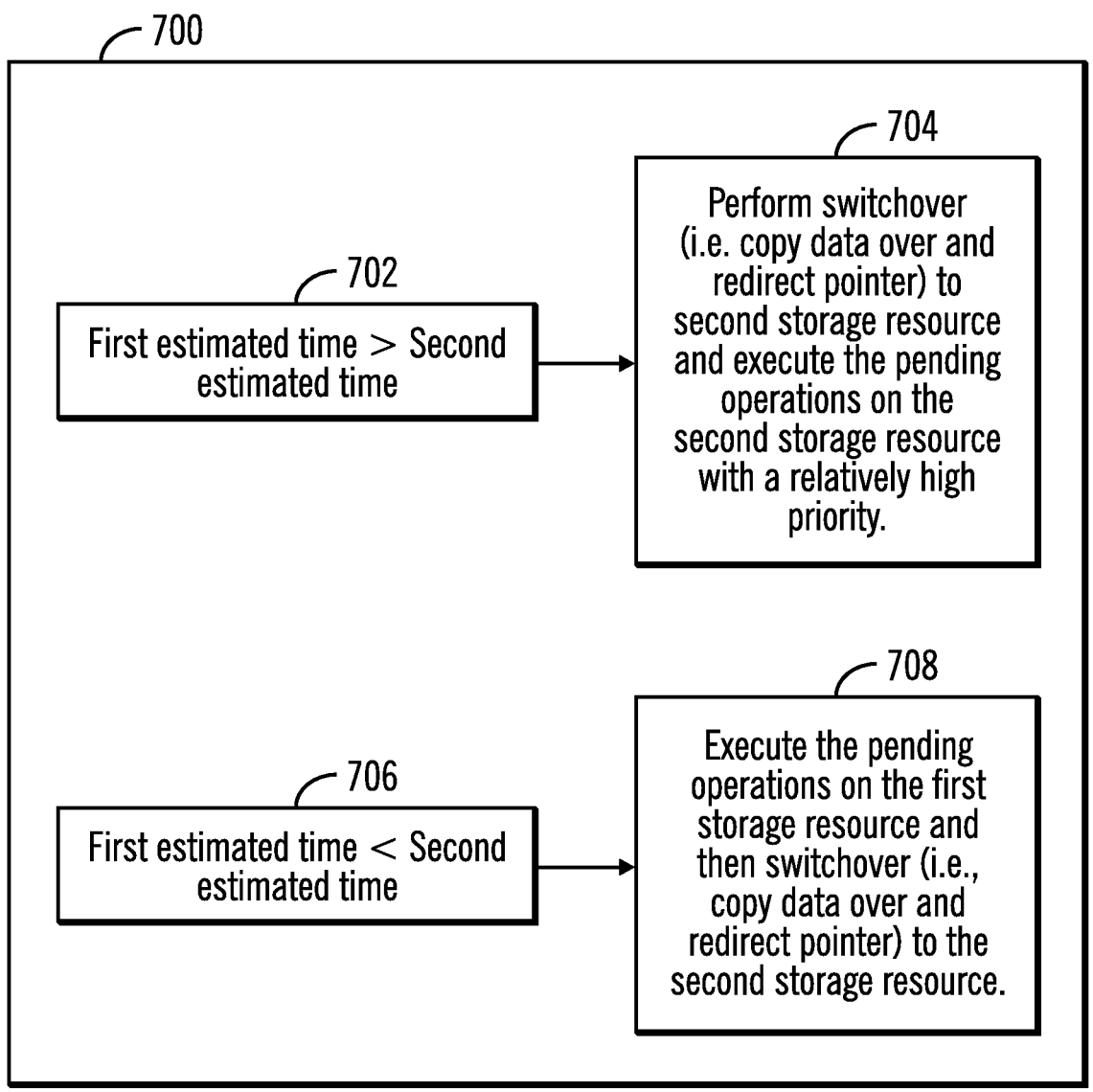
FIG. 7 illustrates a block diagram that shows conditions in which pending operations are performed in a first storage resource or moved to a second storage resource, in accordance with certain embodiments.
Figure 8:
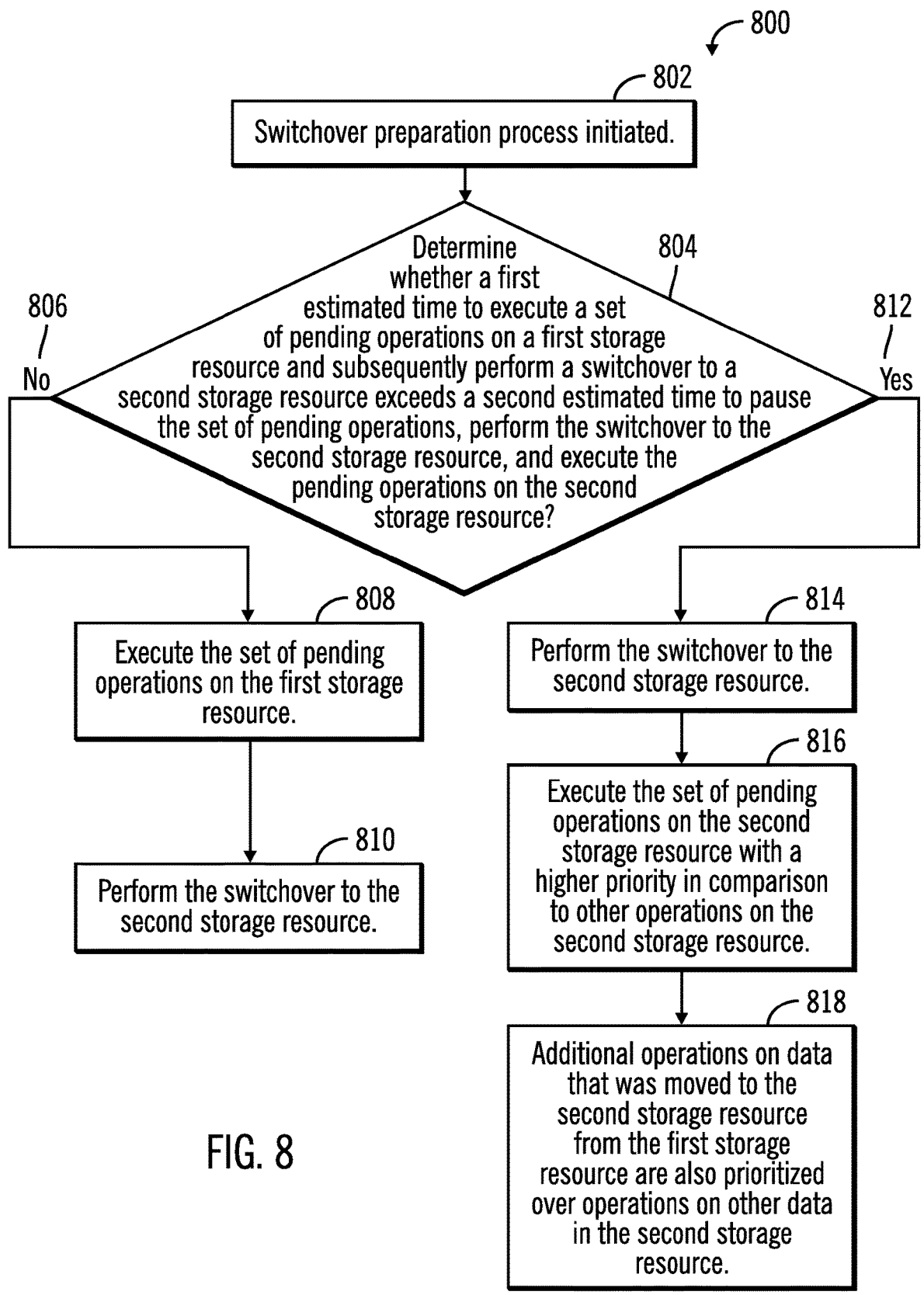
FIG. 8 illustrates a flowchart that shows how switchover operations are performed based on the first and second estimated times, in accordance with certain embodiments.

In FIG. 2, two different switchover processes were shown to determine how requests on the pending queue 124 are to be processed. In certain embodiments, a timing comparison is made to determine which of the two switchover processes shown in FIG. 2 (via branches 229, 236) to use, and such embodiments are shown in FIGS. 6-8.

Figure 6:
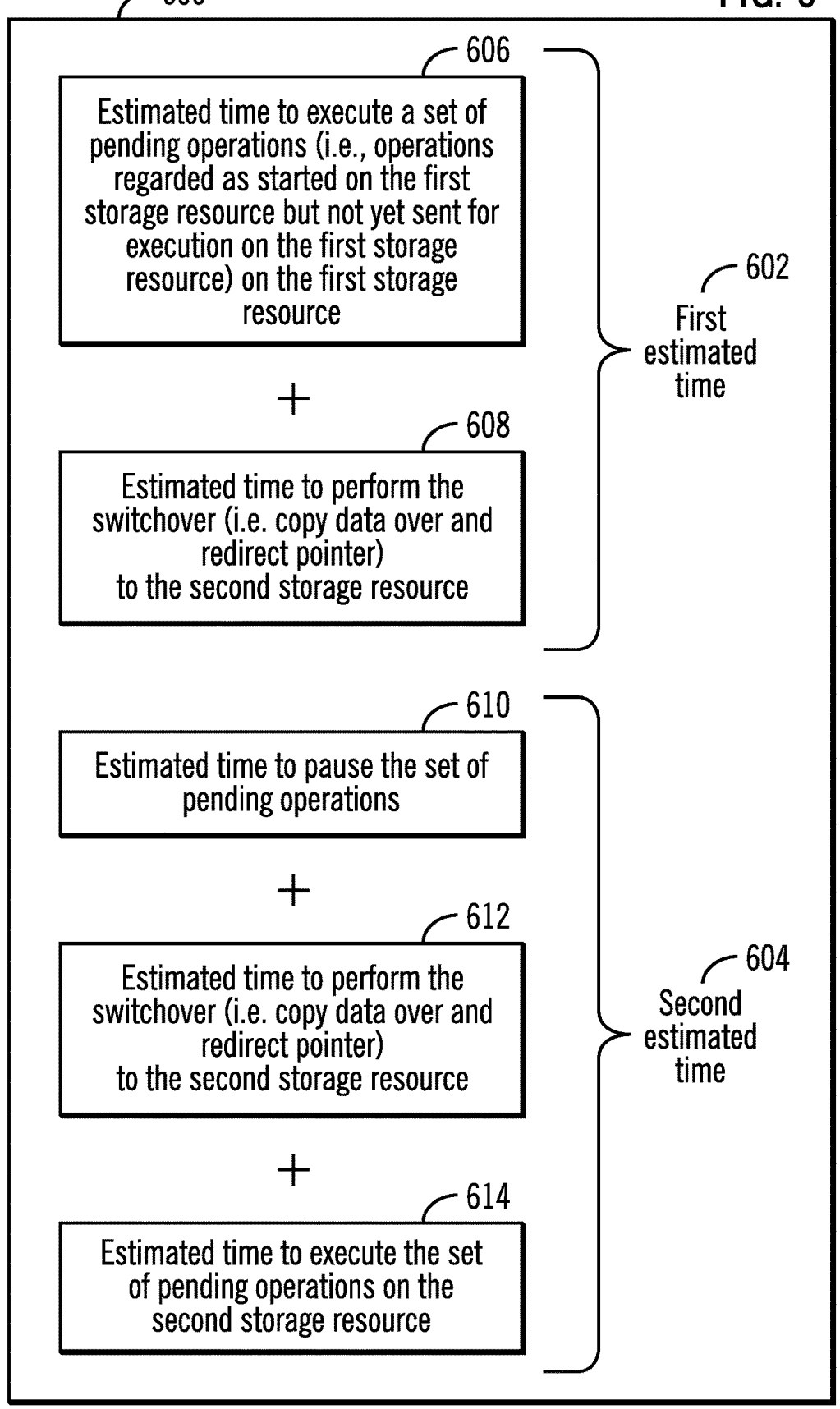
FIG. 6 illustrates a block diagram that shows a first estimated time and a second estimated time for a switchover from a first storage resource to a second storage resource, in accordance with certain embodiments.

FIG. 6 illustrates a block diagram 600 that shows a first estimated time 602 and a second estimated time 604 for a switchover from a first storage resource 104 to a second storage resource 106, in accordance with certain embodiments.

The first estimated time 602 is a sum of the estimated time to execute a set of pending operations on a first storage resource 104 (reference numeral 606) and subsequently perform a switchover to a second storage resource 106 (reference numeral 608).

The second estimated time 604 is the sum of the estimated time to pause the set of pending operations (block 610), the estimated time to perform the switchover (block 612) and the estimated time to execute the set of pending operations on the second storage resource 106 (block 614).

FIG. 7 illustrates a block diagram 700 that shows conditions in which pending operations are performed in a first storage resource 104 or moved to a second storage resource 106, in accordance with certain embodiments.

If the first estimated time 602 is greater than the second estimated time 604 (block 702), then the performance monitoring and switchover application 112 performs switchover (redirect pointer) to second storage resource 106 and executes the pending operations on the second storage resource 106 with a relatively high priority (at block 704)

If the first estimated time 602 is less than the second estimated time 604 (block 706) then the performance monitoring and switchover application 112 executes the pending operations on the first storage resource 104 and then performs switchover (redirect pointer) to the second storage resource (at block 708).

FIG. 8 illustrates a flowchart 800 that shows how switchover operations are performed based on the first estimated time 602 and the second estimated time 604, in accordance with certain embodiments.

Control starts at block 802 in which a switchover preparation process is initiated. Control proceeds to block 804 in which the performance monitoring and switchover application 112 determines whether a first estimated time 602 to execute a set of pending operations on a first storage resource 104 and subsequently perform a switchover to a second storage resource 106 exceeds a second estimated time 604 to pause the set of pending operations, perform the switchover to the second storage resource 106, and perform the pending operations on the second storage resource 106. If not ("No" branch 806) then the set of pending operations are executed on the first storage resource 104 (at block 608) and the switchover to the second storage resource 106 is performed (at block 810). If so ("Yes" branch 812) then the switchover to the second storage resource 106 is performed (at block 814).The performance monitoring and switchover application 112 executes (at block 816) the set of pending operations on the second storage resource 106 with a higher priority in comparison to other operations on the second storage resource 106. Additional operations on data that was moved to the second storage resource 106 from the first storage resource 104 may also prioritized over operations on other data in the second storage resource 106 (at block 818).

Therefore, FIGS. 1-8 shows embodiments in which if an extent is moved from a first storage resource 104 to a second storage resource 106, then pending operations (in a pending queue 124) on the first storage resource 104 are configured for execution on the second storage resource.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
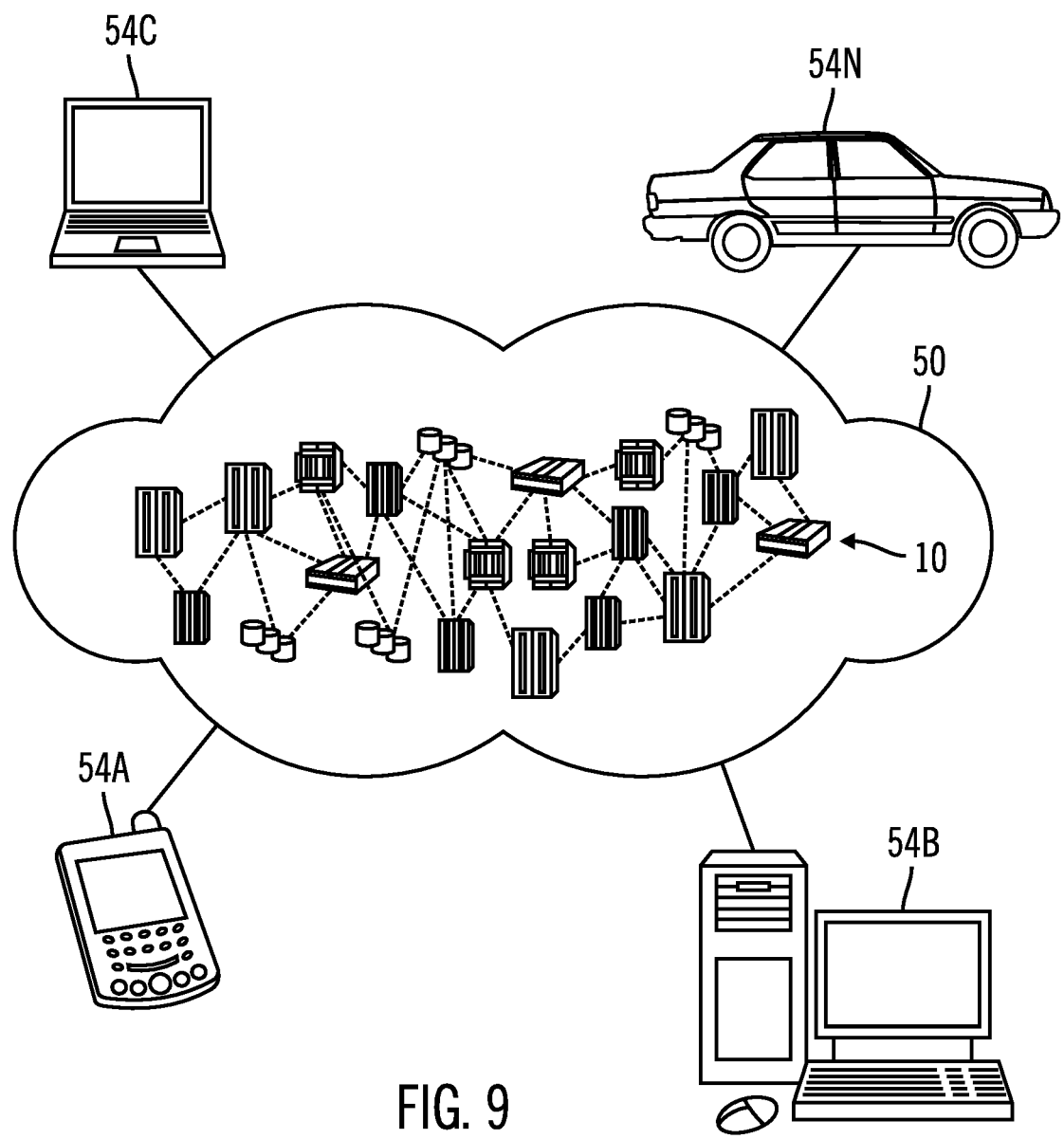
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
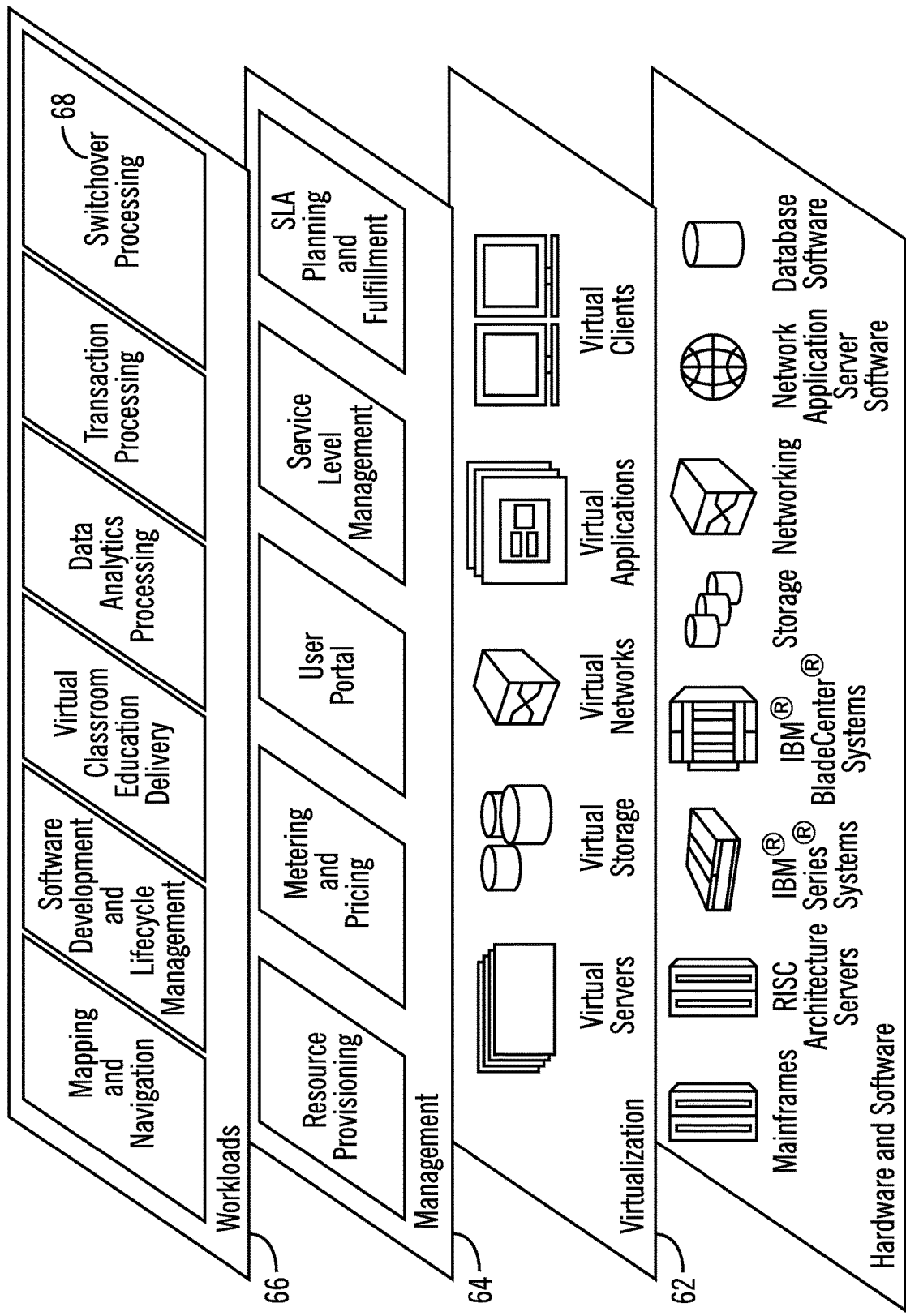
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and switchover processing functions 68 as shown in FIGS. 1-9. The cloud computing environment shown in FIGS. 9-10 may include the computing environment 100 shown in at least FIG. 1.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
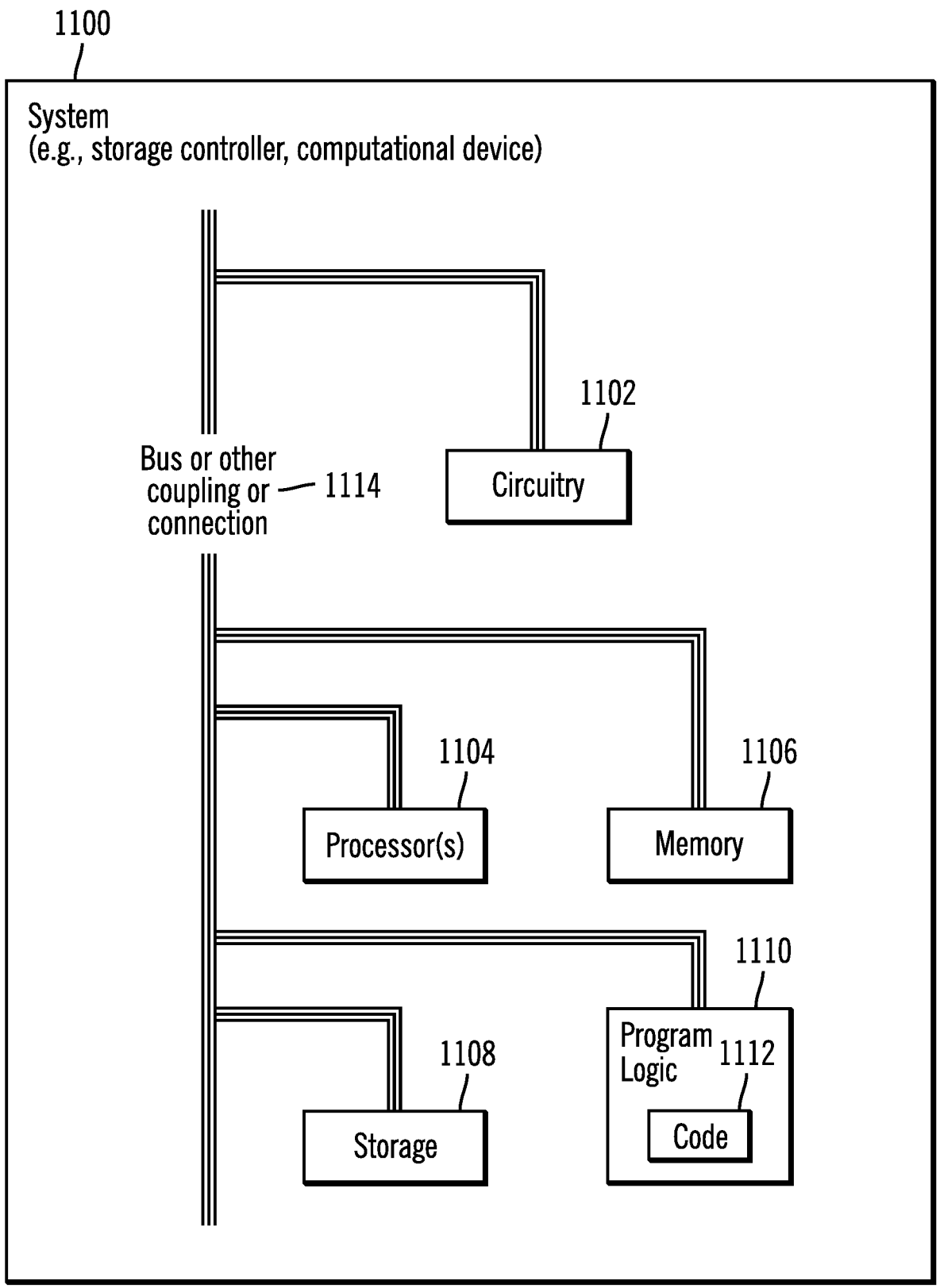
FIG. 11 illustrates a block diagram of a computational system that shows certain elements that may be included in the storage controller shown in FIG. 1, in accordance with certain embodiments.

FIG. 11 illustrates a block diagram that shows certain elements that may be included in the storage controller 102, the hosts 108, 110 or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    determining that data stored in an extent of a first storage resource is to be moved to an extent of a second storage resource;
    in response to determining that a first estimated time to execute a set of pending operations on a first storage resource and subsequently perform a switchover to a second storage resource exceeds a second estimated time to pause the set of pending operations, perform the switchover to the second storage resource and subsequently execute the set of pending operations on the second storage resource, performing the switchover to the second storage resource; and
    in response to determining that the first estimated time does not exceed the second estimated time, executing the set of pending operations on the first storage resource and subsequently performing the switchover to the second storage resource.

2. The method of claim 1, wherein the pending operations comprise pending input/output (I/O) requests, the method further comprising:
    storing a plurality of pending I/O requests on the extent of the first storage resource while the data stored in the extent of the first storage resource is being copied to the extent of the second storage resource, wherein the plurality of pending I/O requests have not been transmitted to the first storage resource for execution at least at some instant of time prior to completion of copying of data stored in the extent of the first storage resource to the extent of the second storage resource; and
    in response to completion of copying of data stored in the extent of the first storage resource to the extent of the second storage resource, indicating that those I/O requests of the plurality of pending I/O requests that have not been transmitted to the first storage resource for execution, are to be executed in the second storage resource and not in the first storage resource.

3. The method of claim 2, wherein a higher priority is indicated for those I/O requests of the plurality of pending I/O requests that have not been transmitted to the first storage resource for execution, in comparison to other I/O requests, in response to indicating that those I/O requests of the plurality of pending I/O requests that have not been transmitted to the first storage resource for execution, are to be executed in the second storage resource and not in the first storage resource.

4. The method of claim 2, wherein a higher priority is indicated for the plurality of pending I/O requests in comparison to other I/O requests prior to completion of copying of data stored in the extent of the first storage resource to the extent of the second storage resource, wherein at least some of the plurality of pending I/O requests are transmitted to the first storage resource for execution prior to completion of copying of data stored in the extent of the first storage resource to the extent of the second storage resource, and remaining I/O requests comprising those I/O requests of the plurality of pending I/O requests that have not been transmitted to the first storage resource for execution, are scheduled for execution in the second storage resource and not in the first storage resource.

5. The method of claim 2, the method further comprising:
    monitoring performance of the first storage resource and the second storage resource; and
    in response to determining that the first storage resource has a slower response time for processing operations than the second storage resource, initiating a process to move data to the second storage resource.

6. The method of claim 2, wherein in response to completion of moving data from the first storage resource to the second storage resource, and indicating that those I/O requests of the plurality of pending I/O requests that have not been transmitted to the first storage resource for execution, are to be executed in the second storage resource and not in the first storage resource, performing:
    updating a pointer that pointed to the first storage resource to point to the second storage resource.

7. A system, comprising:
    a memory; and
    a processor coupled to the memory, wherein the processor performs operations, the operations comprising:

determining that data stored in an extent of a first storage resource is to be moved to an extent of a second storage resource;

in response to determining that a first estimated time to execute a set of pending operations on a first storage resource and subsequently perform a switchover to a second storage resource exceeds a second estimated time to pause the set of pending operations, perform the switchover to the second storage resource and subsequently execute the set of pending operations on the second storage resource, performing the switchover to the second storage resource; and in response to determining that the first estimated time does not exceed the second estimated time, executing the set of pending operations on the first storage resource and subsequently performing the switchover to the second storage resource.

8. The system of claim 7, wherein the pending operations comprise pending input/output (I/O) requests, the operations further comprising:

storing a plurality of pending I/O requests on the extent of the first storage resource while the data stored in the extent of the first storage resource is being copied to the extent of the second storage resource, wherein the plurality of pending I/O requests have not been transmitted to the first storage resource for execution at least at some instant of time prior to completion of copying of data stored in the extent of the first storage resource to the extent of the second storage resource; and in response to completion of copying of data stored in the extent of the first storage resource to the extent of the second storage resource, indicating that those I/O requests of the plurality of pending I/O requests that have not been transmitted to the first storage resource for execution, are to be executed in the second storage resource and not in the first storage resource.

9. The system of claim 8, wherein a higher priority is indicated for those I/O requests of the plurality of pending I/O requests that have not been transmitted to the first storage resource for execution, in comparison to other I/O requests, in response to indicating that those I/O requests of the plurality of pending I/O requests that have not been transmitted to the first storage resource for execution, are to be executed in the second storage resource and not in the first storage resource.

10. The system of claim 8, wherein a higher priority is indicated for the plurality of pending I/O requests in comparison to other I/O requests prior to completion of copying of data stored in the extent of the first storage resource to the extent of the second storage resource, wherein at least some of the plurality of pending I/O requests are transmitted to the first storage resource for execution prior to completion of copying of data stored in the extent of the first storage resource to the extent of the second storage resource, and remaining I/O requests comprising those I/O requests of the plurality of pending I/O requests that have not been transmitted to the first storage resource for execution, are scheduled for execution in the second storage resource and not in the first storage resource.

11. The system of claim 8, the operations further comprising:

monitoring performance of the first storage resource and the second storage resource; and in response to determining that the first storage resource has a slower response time for processing operations than the second storage resource, initiating a process to move data to the second storage resource.

12. The system of claim 8, wherein in response to completion of moving data from the first storage resource to the second storage resource, and indicating that those I/O requests of the plurality of pending I/O requests that have not been transmitted to the first storage resource for execution, are to be executed in the second storage resource and not in the first storage resource, performing:

updating a pointer that pointed to the first storage resource to point to the second storage resource.

13. A computer program product, the computer program product comprising a computer readable storage medium having program instructions embodied therewith, the program instructions executable to cause operations to be performed, the operations comprising:

determining that data stored in an extent of a first storage resource is to be moved to an extent of a second storage resource;

in response to determining that a first estimated time to execute a set of pending operations on a first storage resource and subsequently perform a switchover to a second storage resource exceeds a second estimated time to pause the set of pending operations, perform the switchover to the second storage resource and subsequently execute the set of pending operations on the second storage resource, performing the switchover to the second storage resource; and in response to determining that the first estimated time does not exceed the second estimated time, executing the set of pending operations on the first storage resource and subsequently performing the switchover to the second storage resource.

14. The computer program product of claim 13, wherein the pending operations comprise pending input/output (I/O) requests, the operations further comprising:

storing a plurality of pending I/O requests on the extent of the first storage resource while the data stored in the extent of the first storage resource is being copied to the extent of the second storage resource, wherein the plurality of pending I/O requests have not been transmitted to the first storage resource for execution at least at some instant of time prior to completion of copying of data stored in the extent of the first storage resource to the extent of the second storage resource; and in response to completion of copying of data stored in the extent of the first storage resource to the extent of the second storage resource, indicating that those I/O requests of the plurality of pending I/O requests that have not been transmitted to the first storage resource for execution, are to be executed in the second storage resource and not in the first storage resource.

15. The computer program product of claim 14, wherein a higher priority is indicated for those I/O requests of the plurality of pending I/O requests that have not been transmitted to the first storage resource for execution, in comparison to other I/O requests, in response to indicating that those I/O requests of the plurality of pending I/O requests that have not been transmitted to the first storage resource for execution, are to be executed in the second storage resource and not in the first storage resource.

16. The computer program product of claim 14, wherein a higher priority is indicated for the plurality of pending I/O requests in comparison to other I/O requests prior to completion of copying of data stored in the extent of the first storage resource to the extent of the second storage resource, wherein at least some of the plurality of pending I/O requests are transmitted to the first storage resource for execution prior to completion of copying of data stored in the extent of the first storage resource to the extent of the second storage resource, and remaining I/O requests comprising those I/O requests of the plurality of pending I/O requests that have not been transmitted to the first storage resource for execution, are scheduled for execution in the second storage resource and not in the first storage resource.

17. The computer program product of claim 14, the operations further comprising:
   monitoring performance of the first storage resource and the second storage resource; and
   in response to determining that the first storage resource has a slower response time for processing operations than the second storage resource, initiating a process to move data to the second storage resource.

18. The computer program product of claim 14, wherein in response to completion of moving data from the first storage resource to the second storage resource, and indicating that those I/O requests of the plurality of pending I/O requests that have not been transmitted to the first storage resource for execution, are to be executed in the second storage resource and not in the first storage resource, performing:
   updating a pointer that pointed to the first storage resource to point to the second storage resource.

\* \* \* \* \*